United States Patent
Kurotsu

(10) Patent No.: US 10,171,700 B2
(45) Date of Patent: Jan. 1, 2019

(54) IMAGE READING APPARATUS AND IMAGE FORMING APPARATUS THEREFOR, THAT ENSURE RELEASING OF CARRIAGE MOVEMENT RESTRICTION

(71) Applicant: Kyocera Document Solutions Inc., Osaka (JP)

(72) Inventor: Yoshihiko Kurotsu, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 49 days.

(21) Appl. No.: 15/594,602

(22) Filed: May 13, 2017

(65) Prior Publication Data

US 2017/0331971 A1 Nov. 16, 2017

(30) Foreign Application Priority Data

May 13, 2016 (JP) ................. 2016-096921

(51) Int. Cl.
| | |
|---|---|
| *H04N 1/10* | (2006.01) |
| *G03G 15/04* | (2006.01) |
| *H04N 1/00* | (2006.01) |
| *H04N 1/12* | (2006.01) |
| *G03G 15/00* | (2006.01) |

(52) U.S. Cl.
CPC ..... *H04N 1/1017* (2013.01); *G03G 15/04045* (2013.01); *H04N 1/00551* (2013.01); *H04N 1/00559* (2013.01); *H04N 1/00615* (2013.01); *H04N 1/00795* (2013.01); *H04N 1/1061* (2013.01); *H04N 1/121* (2013.01); *G03G 15/605* (2013.01); *H04N 2201/0094* (2013.01); *H04N 2201/0444* (2013.01)

(58) Field of Classification Search
USPC ....... 358/1.1–3.29, 1.11–1.18, 497; 347/138, 347/152, 160, 170, 222, 242, 263, 264, 347/110; 396/12, 146; 399/211, 214
See application file for complete search history.

(56) References Cited

U.S. PATENT DOCUMENTS

| | | | | |
|---|---|---|---|---|
| 9,065,946 | B2* | 6/2015 | Inada | ................. H04N 1/00554 |
| 2013/0286433 | A1* | 10/2013 | Matsushima | ...... G03G 15/5087 358/1.15 |

* cited by examiner

*Primary Examiner* — Marcellus Augustin
(74) *Attorney, Agent, or Firm* — HEA Law PLLC

(57) ABSTRACT

An image reading apparatus includes an image reading unit, a mounting portion, and a cover member. The cover member includes a first restricting portion, a lock portion, and an operation portion. The operation portion operated from outside the main unit is displaceable in a direction in which the lock portion deforms from the locking shape into the releasing shape. The mounting portion includes a second restricting portion and a part. The second restricting portion restricts displacement of the operation portion in the cover member mounted on the mounting portion in the second orientation. The part has a second aperture opening into the lock portion in the cover member mounted on the mounting portion in the second orientation from outside the main unit. The second aperture is an opening for the insertion of a tool for deforming the lock portion from the locking shape into the releasing shape.

9 Claims, 5 Drawing Sheets

IMAGE READING APPARATUS AND IMAGE FORMING APPARATUS THEREFOR, THAT ENSURE RELEASING OF CARRIAGE MOVEMENT RESTRICTION

INCORPORATION BY REFERENCE

This application is based upon, and claims the benefit of priority from, corresponding Japanese Patent Application No. 2016-096921 filed in the Japan Patent Office on May 13, 2016, the entire contents of which are incorporated herein by reference.

BACKGROUND

Unless otherwise indicated herein, the description in this section is not prior art to the claims in this application and is not admitted to be prior art by inclusion in this section.

Commonly, in a typical image reading apparatus, an image reading unit that reads an image of an original document includes a carriage and a carriage supporting unit. The carriage scans an original document on a platen glass. The carriage supporting unit movably supports the carriage along the platen glass.

There is known a configuration where a member installed on a main unit engages with a part of the carriage to secure the carriage in the image reading apparatus. This prevents the unnecessary movement of the carriage, for example, when the image reading apparatus is conveyed.

SUMMARY

An image reading apparatus according to one aspect of the disclosure includes an image reading unit, a mounting portion, and a cover member. The image reading unit includes, inside a main unit thereof, a carriage and a carriage supporting unit. The carriage scans an original document on a platen glass supported by the main unit. The carriage supporting unit supports the carriage to be movable along the platen glass. The image reading unit reads an image from the original document. The mounting portion is a part of the main unit. The mounting portion includes a first aperture opening into the carriage. The cover member is mountable on the mounting portion in a first orientation and in a second orientation. The cover member is mounted on the mounting portion to cover the first opening in the mounting portion. The cover member includes a first restricting portion, a lock portion, and an operation portion. When the cover member is mounted on the mounting portion in the first orientation, the first restricting portion is inserted into the first opening in the mounting portion and positioned in a location where the first restricting portion restricts movement of the carriage, and when the cover member is mounted on the mounting portion in the second orientation, the first restricting portion is positioned in a location where the first restricting portion releases the restriction of movement of the carriage. The lock portion is elastically deformable from a locking shape in which the lock portion engages with part of the mounting portion and retains a state where the cover member is mounted on the mounting portion, into a releasing shape in which the lock portion disengages the engagement with the mounting portion. The operation portion is connected to the lock portion, and the operation portion, by being operated from outside the main unit, is displaceable in a direction in which the lock portion deforms from the locking shape into the releasing shape. The mounting portion includes a second restricting portion and a part where a second aperture is formed. The second restricting portion restricts displacement of the operation portion in the cover member mounted on the mounting portion in the second orientation. The part where the second aperture is formed has a second aperture opening into the lock portion in the cover member mounted on the mounting portion in the second orientation from outside the main unit. The second aperture is an opening for the insertion of a tool for deforming the lock portion from the locking shape into the releasing shape.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
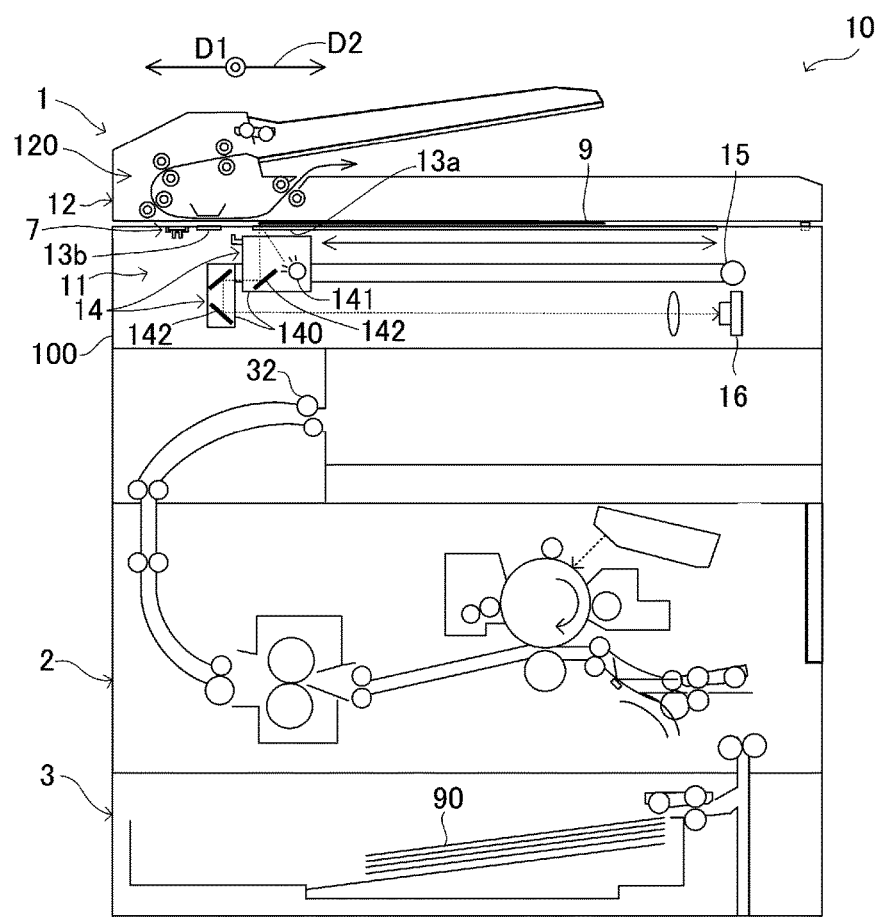
FIG. 1 illustrates a configuration of an image forming apparatus including an image reading apparatus according to a first embodiment.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with respect to the attached drawings. The following embodiments are merely exemplary embodiments according to the disclosure and do not intend to limit the technical scope of the disclosure.

First Embodiment

As illustrated in FIG. 1, an image reading apparatus 1 according to the first embodiment constitutes a part of an image forming apparatus 10. The image forming apparatus 10 includes an image forming unit 2 in addition to the image reading apparatus 1. For example, the image forming apparatus 10 is a copier, a facsimile, or a multi-functional peripheral.

The image reading apparatus 1 includes a transparent platen glass 13a, an image reading unit 11, and a platen cover 12. The platen glass 13a is supported by a main unit 100 of the image reading apparatus 1. The platen cover 12 incorporates an automatic document feeder (ADF) 120.

The image reading apparatus 1 is an apparatus that performs an image process on an image of an original document 9 placed on the platen glass 13a. The original document 9 is a sheet material as an image reading target. The platen glass 13a is a platen on which the original document 9 is placed, and forms a top surface of the main unit 100.

The image process includes an image reading process that reads the image of the original document 9, a process that processes or transfers data of the image read from the original document 9, and similar process.

The platen cover 12 is turnably supported by a hinge (not illustrated) located in the main unit 100. The platen cover 12 is turnable between a closed position where the platen glass 13a is covered from a top, and an opening position where the top of the platen glass 13a is released.

The image reading unit 11 reads the image of the original document 9 placed on the platen glass 13a. The image reading unit 11 includes a carriage 14, a carriage supporting unit 15, and an image sensor 16. The carriage 14 includes a movement support body 140 and a light source 141 that is supported by the movement support body 140.

The light source 141 emits a light from a lower side of the platen glass 13a to light a region along a main-scanning direction D1 of the platen glass 13a. In FIG. 1, the main-scanning direction D1 is a direction orthogonal to a paper surface.

In the embodiment, the carriage 14 includes a plurality of mirrors 142 that are supported by the movement support body 140. The plurality of mirrors 142 guide a reflected light to the image sensor 16 secured to an inside of the main unit 100, from the original document 9. In this case, the movement support body 140 includes a first movement support body 140a that supports the light source 141 and a part of the plurality of mirrors 142, and a second movement support body 140b that supports the other mirrors 142.

The carriage supporting unit 15 is a mechanism that movably supports the carriage 14 along the platen glass 13a. The carriage supporting unit 15 moves the carriage 14 along a sub-scanning direction D2 orthogonal to the main-scanning direction D1.

More specifically, the carriage supporting unit 15 moves the first movement support body 140a and the second movement support body 140b in conjunction with one another along the sub-scanning direction D2. At this time, the carriage supporting unit 15 moves the second movement support body 140b at a half speed of a moving speed of the first movement support body 140a.

In the main unit 100, the carriage 14 irradiates the original document 9 with the light of the light source 141 to scan the original document 9 on the platen glass 13a. The image sensor 16 outputs image data corresponding to a light amount of the reflected light from the original document 9.

The image sensor 16 illustrated in FIG. 1 is a charge coupled device (CCD). A contact image sensor (CIS) where the light source 141 and the image sensor 16 are integrally formed may be employed. In this case, the carriage 14 includes the CIS, and the CIS is supported by the first movement support body 140a. It is not necessary to include the second movement support body 140b.

In a movement range of the carriage 14 in the sub-scanning direction D2, a contact glass 13b is aligned with the platen glass 13a to be located. In a state where the carriage 14 stops at the position opposed to the contact glass 13b, the image reading unit 11 ensures reading the image of the original document 9 conveyed by the ADF 120.

The image forming unit 2 performs an image formation process that forms the image on a sheet 90. An image to be a target of the image formation process is, for example, an image read by the image reading apparatus 1, and an image represented by print job data received from a terminal device.

The image forming unit 2 forms the image corresponding to line image data output from the image reading unit 11 on the sheet 90 supplied from a sheet supply unit 3. The sheet 90 is a sheet-shaped image formation medium such as a paper sheet and an envelope.

The image forming unit 2 illustrated in FIG. 1 forms a toner image on the sheet 90 with an electrophotographic method. The image forming unit 2 may be a device that forms the image on the sheet 90 with another method such as an inkjet printing method.

The image reading apparatus 1 further includes a carriage securing mechanism 7 that secures the carriage 14 to a predetermined position in the main unit 100. As described later, in the carriage securing mechanism 7, the member installed into the main unit 100 engages with a part of the carriage 14 to secure the carriage 14. This prevents the carriage 14 from moving unnecessarily, for example, when the image forming apparatus 10 including the image reading apparatus 1 is conveyed.

Now, when the image reading apparatus 1 is installed after being conveyed, it is preferred that a simple operation cause the image reading apparatus 1 to be in a usable state where a movement restriction of the carriage 14 is released.

On the other hand, if an easy operation can change the image reading apparatus 1 from the usable state into a state where the movement of the carriage 14 is restricted, this may cause a trouble, for example, an ordinary user misunderstands that the image reading apparatus 1 is broken down. Thus, it is preferred that the image reading apparatus 1 not be easily changed into a carriage secured state where the movement of the carriage 14 is restricted.

For example, when a cover member 6 that restricts the movement of the carriage 14 is housed in a place that is out of the user's sight, the user cannot easily change the image reading apparatus 1 from the usable state into the carriage secured state.

However, the cover member 6 functions as a member that covers first apertures 5a (described later) communicating with the image reading unit 11 in the main unit 100. In order to prevent dust from entering the image reading unit 11, it is preferred that the cover member 6 be installed into a position that covers the first apertures 5a in the main unit 100 even when the image reading apparatus 1 is in the usable state.

The carriage securing mechanism 7 of the image reading apparatus 1 includes a structure that prevents the easy change into the state that restricts the movement of the carriage 14 while easily releasing the movement restriction of the carriage 14 in the image reading unit 11. The following describes the structure of the carriage securing mechanism 7.

Carriage Securing Mechanism 7

As illustrated in FIGS. 2 to 6, the carriage securing mechanism 7 includes: a mounting portion 5 that is a part of the main unit 100; and the cover member 6 that is mounted on the mounting portion 5.

The mounting portion 5 is the part of the main unit 100 and is a portion on which the first apertures 5a communicating with the carriage 14 in the main unit 100 are formed. The mounting portion 5 is formed into a depressed shape that the cover member 6 fits. The mounting portion 5 includes first cover engaging portions 5b, second cover engaging portions 5c, an operation restricting portion 5d, and a part having a second aperture 5e.

The cover member 6 includes a cover base portion 6a, a movement restricting portion 6b, a protruding portion 6c, a lock portion 6d, an operation portion 6g, and a cutout portion 6h. The movement restricting portion 6b is formed projecting toward the inside of the main unit 100 from the cover base portion 6a. The movement restricting portion 6b is an exemplary first restricting portion.

Figure 2:
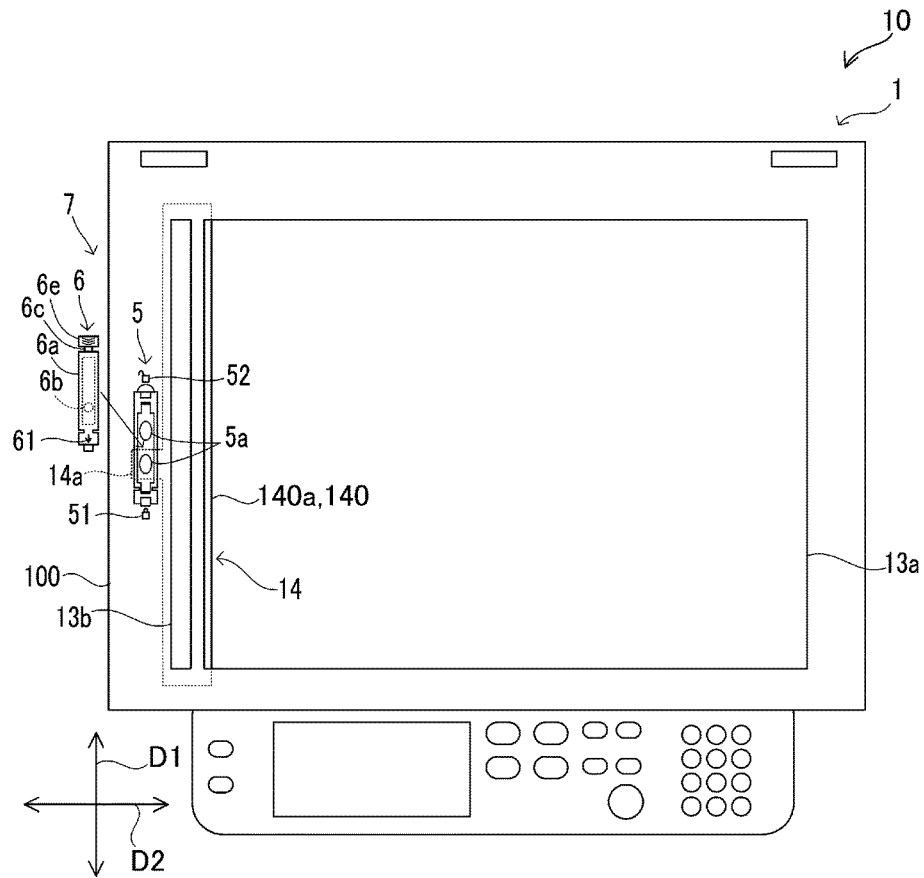
FIG. 2 illustrates a plan view of a main unit of the image reading apparatus according to the first embodiment.
Figure 4:
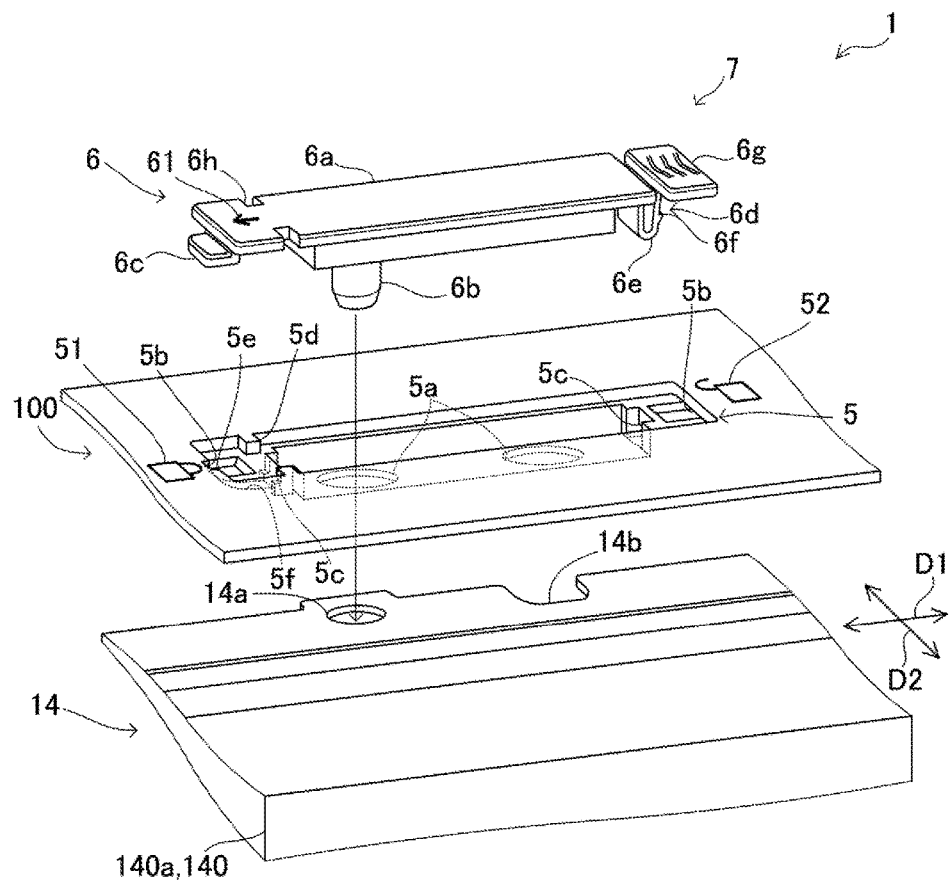
FIG. 4 illustrates an exploded perspective view of the carriage securing mechanism included in the image forming apparatus according to the first embodiment.
Figure 5:
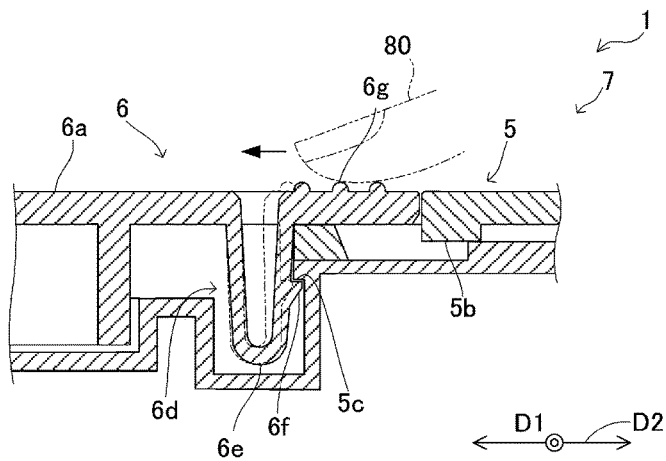
FIG. 5 illustrates a cross section of a peripheral portion of a lock portion of a cover member mounted in a first orientation of the carriage securing mechanism included in the image forming apparatus according to the first embodiment.
Figure 6:
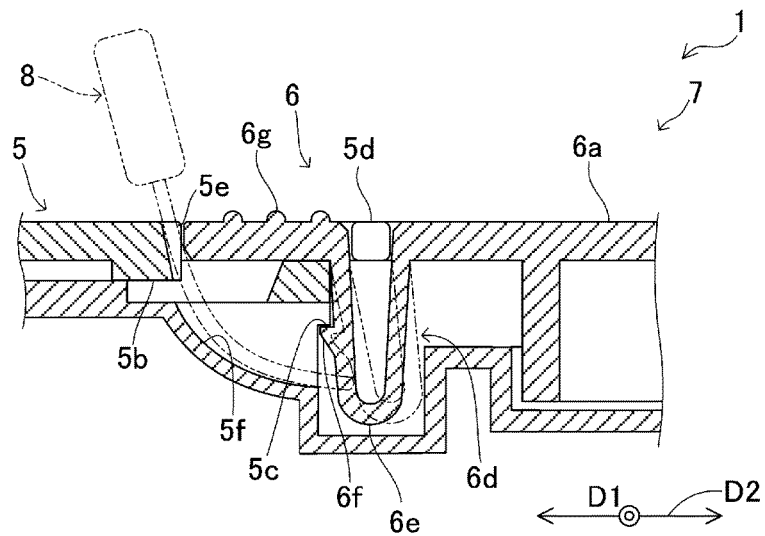
FIG. 6 illustrates a cross section of a peripheral portion of the lock portion of the cover member mounted in a second orientation of the carriage securing mechanism included in the image forming apparatus according to the first embodiment.

The cover member 6 is configured to be mounted on the mounting portion 5 in a first orientation and a second orientation. FIGS. 2, 4, and 5 illustrate the cover member 6 in the first orientation, and FIG. 6 illustrates the cover member 6 in the second orientation.

The cover member 6 is mounted on the mounting portion 5 in the first orientation and the second orientation, which causes the cover base portion 6a of the cover member 6 to cover the first apertures 5a of the mounting portion 5.

The first orientation and the second orientation of the image reading apparatus 1 are directions where a longitudinal direction of the cover member 6 is along the main-scanning direction D1, and the second orientation is a direction opposite to the first orientation. In other words, the second orientation is a direction rotated by 180 degrees on a horizontal surface.

When being mounted on the mounting portion 5 in the first orientation, the cover member 6 engages with the part of the carriage 14 to restrict the movement of the carriage 14. On the other hand, when being mounted on the mounting portion 5 in the second orientation, the cover member 6 releases the movement restriction of the carriage 14.

Specifically, when the cover member 6 is mounted on the mounting portion 5 in the first orientation, the movement restricting portion 6b is inserted into the first aperture 5a of the mounting portion 5 to be located at the position that restricts the movement of the carriage 14.

Figure 3:
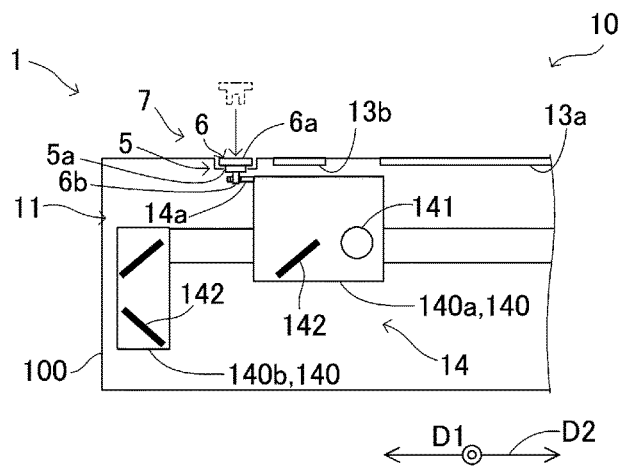
FIG. 3 illustrates a configuration of a carriage securing mechanism included in the image reading apparatus according to the first embodiment.

As illustrated in FIGS. 3 and 4, a carriage side engaging portion 14a is formed on the movement support body 140 of the carriage 14. The carriage side engaging portion 14a engages with the movement restricting portion 6b in the sub-scanning direction D2 when the cover member 6 is mounted in the first orientation. In a state where the movement restricting portion 6b reaches the position where the movement restricting portion 6b engages with the carriage side engaging portion 14a, the movement of the carriage 14 is restricted in the sub-scanning direction D2.

On the other hand, when the cover member 6 is mounted on the mounting portion 5 in the second orientation, the movement restricting portion 6b is located at the position where the movement restricting portion 6b releases the movement restriction of the carriage 14. In the example illustrated in FIG. 4, the position for releasing the movement restriction of the carriage 14 is the position of an inside of a cutout portion 14b formed on the movement support body 140 of the carriage 14. The cutout portion 14b is formed to avoid an interference between the movement restricting portion 6b and the carriage 14 that moves in the sub-scanning direction D2.

In the examples illustrated in FIGS. 2 and 4, the two first apertures 5a are formed. One of the two first apertures 5a is an aperture into which the movement restricting portion 6b is inserted when the cover member 6 is mounted on the mounting portion 5 in the first orientation. The other first aperture 5a is an aperture into which the movement restricting portion 6b is inserted when the cover member 6 is mounted on the mounting portion 5 in the second orientation.

The two first apertures 5a may be connected to one another. The mounting portion 5 may include a concave portion into which the movement restricting portion 6b is inserted instead of the one first apertures 5a into which the movement restricting portion 6b is inserted when the cover member 6 is mounted on the mounting portion 5 in the second orientation. In this case, the concave portion is formed over the position of the cutout portion 14b of the carriage 14 from a position higher than the carriage 14.

The protruding portion 6c is located on one end portion in a longitudinal direction of the cover base portion 6a, and the lock portion 6d is located on the other end portion in the longitudinal direction of the cover base portion 6a. The protruding portion 6c is formed projecting out of the cover base portion 6a along the longitudinal direction of the cover base portion 6a.

The protruding portion 6c is a portion that engages with the first cover engaging portion 5b of the mounting portion 5 when the cover member 6 is mounted on the mounting portion 5 in the first orientation and the second orientation.

The first cover engaging portions 5b are located at two positions of: a position corresponding to the protruding portion 6c of the cover member 6 mounted in the first orientation; and a position corresponding to the protruding portion 6c of the cover member 6 mounted in the second orientation.

The lock portion 6d is a portion that is elastically deformable from a lock shape to a release shape. The lock shape is a shape that engages with the second cover engaging portion 5c, which is a part of the mounting portion 5, to retain the state where the cover member 6 is mounted on the mounting portion 5. The release shape is a shape where the engagement with the second cover engaging portion 5c of the mounting portion 5 is disengagable. The lock portion 6d maintains the lock shape in a natural state where an external force is not applied.

As illustrated in FIGS. 4 to 6, the lock portion 6d includes: a folded portion 6e that is elastically deformable along the main-scanning direction D1; and a protrusion portion 6f projecting from the folded portion 6e. When the lock portion 6d has the lock shape, the protrusion portion 6f engages with the second cover engaging portion 5c.

The protrusion portion 6f of the lock portion 6d engages with the second cover engaging portion 5c in a state where the protruding portion 6c engages with the first cover engaging portion 5b, retaining a state where the cover member 6 is mounted on the mounting portion 5.

The second cover engaging portions 5c are located at two positions of: a position corresponding to the lock portion 6d of the cover member 6 mounted in the first orientation; and a position corresponding to the lock portion 6d of the cover member 6 mounted in the second orientation.

As illustrated in FIG. 5, the operation portion 6g is connected to the lock portion 6d, and is a portion that is operated by a hand 80 of the user from an outside of the main unit 100. In the embodiment, the operation portion 6g is integrally formed with the lock portion 6d.

The operation portion 6g is displaceable to a direction that deforms the lock portion 6d from the lock shape into the release shape. In the embodiment, the operation portion 6g is displaceable along the main-scanning direction D1. In FIG. 5, the hand 80 and the lock portion 6d having the release shape are illustrated with virtual lines (a two-dot chain line).

In a state where the cover member 6 is mounted on the mounting portion 5 in the first orientation, the operation portion 6g receives a force from a finger of the user to be displaced, causing the lock portion 6d to elastically deform from the lock shape into the release shape. This ensures the cover member 6 removed from the mounting portion 5.

As illustrated in FIG. 6, the operation restricting portion 5d is a portion that restricts a displacement of the operation portion 6g in the cover member 6 mounted on the mounting portion 5 in the second orientation. That is, when the cover member 6 is mounted on the mounting portion 5 in the second orientation, the operation portion 6g contacts the operation restricting portion 5d to disable the lock portion 6d from displacing to a direction that deforms it into the release shape.

Thus, when the cover member 6 is mounted on the mounting portion 5 in the second orientation, the user cannot remove the cover member 6 from the mounting portion 5 by operating the operation portion 6g with the hand 80. The operation restricting portion 5d is an exemplary second restricting portion. The operation restricting portion 5d is located at one position on one end side in a longitudinal direction of the mounting portion 5. A portion that restricts the displacement of the operation portion 6g in the cover member 6 mounted on the mounting portion 5 in the first orientation is not formed on the mounting portion 5.

The cutout portion 6h of the cover member 6 is a portion where the operation restricting portion 5d fits when the cover member 6 is mounted on the mounting portion 5 in the first orientation. This avoids interference between the cover member 6 and the operation restricting portion 5d when the cover member 6 is mounted on the mounting portion 5 in the first orientation.

The second aperture 5e is an aperture opening into the lock portion 6d in the cover member 6 mounted on the mounting portion 5 in the second orientation from the outside of the main unit 100. As illustrated in FIG. 6, the second aperture 5e is an aperture into which a tool 8 is inserted. The tool 8 deforms the lock portion 6d from the lock shape into the release shape. The second aperture 5e is located at one position on the one end in the longitudinal direction of the mounting portion 5. An aperture opening into the lock portion 6d in the cover member 6 mounted on the mounting portion 5 in the first orientation is not formed on the mounting portion 5.

When the tool 8 is further pushed in a state where a distal end portion of the tool 8 is inserted into the second aperture 5e, the distal end portion of the tool 8 pushes the folded portion 6e of the lock portion 6d to deform the lock portion 6d from the lock shape into the release shape.

In FIG. 6, the tool 8 and the lock portion 6d having the release shape are illustrated with virtual lines. When the cover member 6 is mounted on the mounting portion 5 in the second orientation, the user or a maintenance person for the image forming apparatus 10 uses the tool 8 to remove the cover member 6 from the mounting portion 5.

For example, a tool holding portion that removably holds the tool 8 may be located inside an opening/closing cover (not illustrated) located in the main unit 100.

In the embodiment, the release shape of the lock portion 6d deformed by an operation of the operation portion 6g is different from the release shape of the lock portion 6d deformed by being pushed by the distal end portion of the tool 8 (see FIGS. 5 and 6).

As illustrated in FIG. 6, the mounting portion 5 includes a guide surface 5f that guides the distal end portion of the tool 8 inserted into the second aperture 5e to the folded portion 6e of the lock portion 6d. The guide surface 5f is located at one position on the one end in the longitudinal direction of the mounting portion 5. The guide surface 5f is not located on the other end in the longitudinal direction of the mounting portion 5.

When the carriage securing mechanism 7 is employed, the easy change into the state that restricts the movement of the carriage 14 is prevented while the movement restriction of the carriage 14 in the image reading unit 11 is easily released.

The mounting portion 5 includes the guide surface 5f, ensuring the comparatively easy remove of the cover member 6 from the mounting portion 5 when even the tool 8 is used.

As illustrated in FIGS. 2 and 4, an arrow mark 61 is formed at one position close to one end in the longitudinal direction of the cover member 6. The arrow mark 61 is an exemplary first mark.

A lock mark 51 and an unlock mark 52 are formed at two positions of: a position close to the one end in the longitudinal direction of the mounting portion 5 in the main unit 100; and a position close to the other end. The lock mark 51 is formed at a position corresponding to the arrow mark 61 when the cover member 6 is mounted on the mounting portion 5 in the first orientation. The unlock mark 52 is formed at a position corresponding to the arrow mark 61 when the cover member 6 is mounted on the mounting portion 5 in the second orientation. The lock mark 51 represents a state where the movement of the carriage 14 is restricted, and the unlock mark 52 represents a state where the movement restriction of the carriage 14 is released. The lock mark 51 and the unlock mark 52 are examples of a second mark and a third mark.

The above-described three marks are formed, thus enabling the user to easily confirm a mounting direction of the cover member 6 on the mounting portion 5.

Second Embodiment

Figure 7:
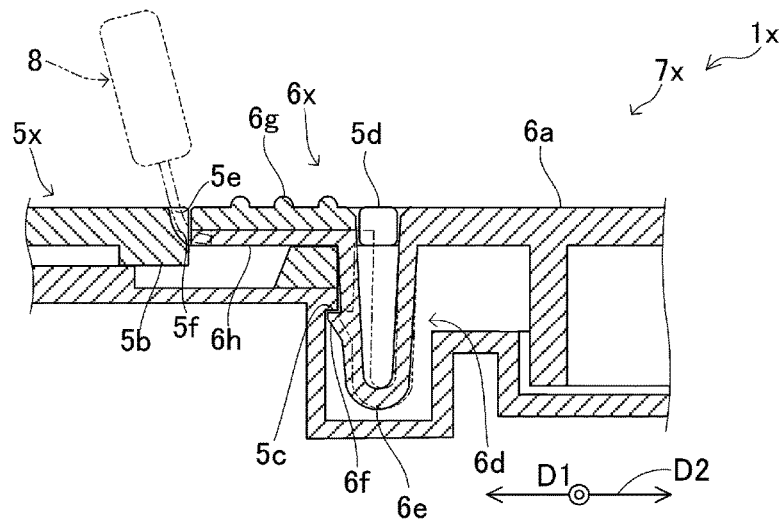
FIG. 7 illustrates a cross section of a peripheral portion of the lock portion of the cover member mounted in the second orientation of the carriage securing mechanism included in the image forming apparatus according to a second embodiment.
Figure 8:
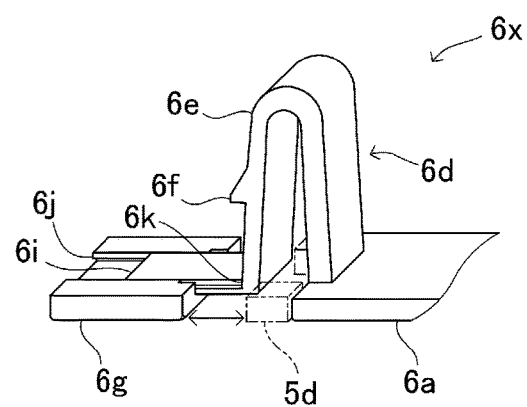
FIG. 8 obliquely illustrates a part of the cover member included in the image forming apparatus according to the second embodiment.

Next, with reference to FIGS. 7 and 8, the following describes an image reading apparatus 1x according to a second embodiment. The image reading apparatus 1x is applied to the image forming apparatus 10 illustrated in FIG. 1 instead of the image reading apparatus 1. In FIGS. 7 and 8, identical reference numerals are used for components identical to the components illustrated in FIGS. 1 to 6.

The image reading apparatus 1x includes a carriage securing mechanism 7x. Compared with the carriage securing mechanism 7 of the image reading apparatus 1, the carriage securing mechanism 7x is different in that the carriage securing mechanism 7x includes a cover member 6x having a structure different from a structure of the connection between the lock portion 6d and the operation portion 6g. The following describes the carriage securing mechanism 7x while focusing the points different from the carriage securing mechanism 7.

As illustrated in FIG. 8, in the cover member 6x of the carriage securing mechanism 7x, the lock portion 6d further includes a connecting portion 6i continuous from the folded portion 6e. Then, in the cover member 6x, the operation portion 6g is slidably connected to the connecting portion 6i. In the operation portion 6g, on the surface opposed to the inside of the main unit 100, a groove 6j into which the connecting portion 6i is slidably fitted is formed. In a state where the cover member 6x is mounted on the mounting portion 5 in the first orientation and the second orientation, the connecting portion 6i is hidden on a back side of the operation portion 6g. Thus, the user cannot displace the connecting portion 6i using the hand 80 from the outside of the main unit 100.

In the connecting portion 6i, an abutting portion 6k is formed. The abutting portion 6k is struck by the operation portion 6g when the operation portion 6g is displaced to a direction that deforms the lock portion 6d into the release shape.

Thus, when the operation portion 6g is operated by the hand 80 of the user to be displaced to the direction that deforms the lock portion 6d into the release shape after the cover member 6x is mounted on the mounting portion 5 in the first orientation, the operation portion 6g pushes the abutting portion 6k to deform the lock portion 6d from the lock shape into the release shape. This ensures the cover member 6x removed from the mounting portion 5.

On the other hand, when the cover member 6x is mounted on the mounting portion 5 in the first orientation, the displacement of the cover member 6x is restricted by the operation restricting portion 5d. In FIG. 8, the operation restricting portion 5d is illustrated with virtual lines. However, the operation restricting portion 5d does not contact the lock portion 6d, and thus does not interfere with the deformation of the lock portion 6d from the lock shape into the release shape.

In the carriage securing mechanism 7x also, when the cover member 6x is mounted on the mounting portion 5 in the second orientation, the user cannot remove the cover member 6x from the mounting portion 5 by operating the operation portion 6g using the hand 80.

In the carriage securing mechanism 7x, the second aperture 5e is an aperture opening into the connecting portion 6i in the cover member 6x mounted on the mounting portion 5 in the second orientation from the outside of the main unit 100. As illustrated in FIG. 7, the second aperture 5e is an aperture into which the tool 8 is inserted. The tool 8 deforms the lock portion 6d from the lock shape into the release shape.

In the carriage securing mechanism 7x, the guide surface 5f of the mounting portion 5 guides the distal end portion of the tool 8 to the connecting portion 6i of the lock portion 6d from the second aperture 5e.

When the tool 8 is further pushed in the state where the distal end portion of the tool 8 is inserted into the second aperture 5e, the distal end portion of the tool 8 presses the connecting portion 6i of the lock portion 6d to deform the lock portion 6d from the lock shape into the release shape.

That is, in a state where the displacement of the operation portion 6g is restricted by the operation restricting portion 5d, the lock portion 6d is deformable from the lock shape into the release shape while sliding to the operation portion 6g.

In FIG. 7, the tool 8 and the lock portion 6d having the release shape are illustrated with virtual lines. When the cover member 6x is mounted on the mounting portion 5 in the second orientation, the user or the maintenance person for the image forming apparatus 10 can remove the cover member 6x from the mounting portion 5 using the tool 8.

In the embodiment, the operation of the operation portion 6g deforms the lock portion 6d to have the release shape identical to the release shape of the lock portion 6d deformed by being pushed by the distal end portion of the tool 8.

When the carriage securing mechanism 7x is employed, the effects similar to a case where the carriage securing mechanism 7 is employed are obtained. Further, when the carriage securing mechanism 7x is employed, the operation restricting portion 5d does not interfere with the deformation of the lock portion 6d. Thus, the distal end portion of the tool 8 inserted into the second aperture 5e pushes the connecting portion 6i, which is near the operation portion 6g, causing the lock portion 6d to comparatively easily deform into the release shape.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus comprising:
   an image reading unit that includes, inside a main unit thereof, a carriage and a carriage supporting unit, the carriage scanning an original document on a platen glass supported by the main unit, the carriage supporting unit supporting the carriage to be movable along the platen glass, the image reading unit reading an image from the original document;
   a mounting portion that is a part of the main unit, the mounting portion including a first aperture opening into the carriage; and
   a cover member mountable on the mounting portion in a first orientation and in a second orientation, the cover member being mounted on the mounting portion to cover the first opening in the mounting portion;
   the cover member including
      a first restricting portion that when the cover member is mounted on the mounting portion in the first orientation, is inserted into the first opening in the mounting portion and positioned in a location where the first restricting portion restricts movement of the carriage, and that when the cover member is mounted on the mounting portion in the second orientation, is positioned in a location where the first restricting portion releases the restriction of movement of the carriage,
      a lock portion that is elastically deformable from a locking shape in which the lock portion engages with part of the mounting portion and retains a state where the cover member is mounted on the mounting portion, into a releasing shape in which the lock portion disengages the engagement with the mounting portion, and
      an operation portion that is connected to the lock portion, and that by being operated from outside the main unit is displaceable in a direction in which the lock portion deforms from the locking shape into the releasing shape; and the mounting portion including
- a second restricting portion that restricts displacement of the operation portion in the cover member mounted on the mounting portion in the second orientation, and
- a part having a second aperture, the second aperture opening into the lock portion in the cover member mounted on the mounting portion in the second orientation from outside the main unit; wherein the second aperture is an opening for the insertion of a tool for deforming the lock portion from the locking shape into the releasing shape.

2. The image reading apparatus according to claim 1, wherein:
the operation portion is slidably connected to the lock portion; and
in a state where the displacement of the operation portion is restricted by the second restricting portion, the lock portion is deformable from the locking shape into the releasing shape while the lock portion slides to the operation portion.

3. The image reading apparatus according to claim 1, wherein the mounting portion includes a guide surface that guides the tool when inserted into the second aperture to the lock portion.

4. The image reading apparatus according to claim 3, wherein:
one of the lock portion and the mounting portion includes a protrusion portion;
the other of the lock portion and the mounting portion includes an engaging portion that engages with the protrusion portion when the lock portion of the cover member mounted on the mounting portion is in the locking shape; and
the tool guided by the guide surface presses a part of the lock portion to deform the lock portion into the releasing shape in which the lock portion disengages the engagement of the protrusion portion with the engaging portion.

5. The image reading apparatus according to claim 1, wherein
the cover member has a first mark; and
the main unit has a second mark and a third mark formed at two positions corresponding to the first mark when the cover member is mounted on the mounting portion in each of the first orientation and the second orientation, the second mark representing a state where the movement of the carriage is restricted, the third mark representing a state where the restriction is released.

6. The image reading apparatus according to claim 1, wherein:
a protruded first mark is formed on a cover member; and
in a state where a cover member is mounted on the mounting portion in the first orientation, the operation portion is displaced in response to a force from a finger of a user to a first mark of an operation portion so as to cause a lock portion to elastically deform from a lock shape into the release shape.

7. The image reading apparatus according to claim 1, wherein:
the cover member further includes a protruding portion on one end portion in a longitudinal direction of the cover member, the protruding portion projecting along the longitudinal direction of the cover member;
the lock portion is provided on another end portion in the longitudinal direction of the cover member; and
the image reading apparatus is further provided with
first cover engaging portions in two locations in the mounting portion, the first cover engaging portions engaging with the protruding portion when the cover member is mounted on the mounting portion in each of the first orientation and the second orientation, and
second cover engaging portions in two locations in the mounting portion, the second cover engaging portions engaging with a part of the lock portion when the cover member is mounted on the mounting portion in each of the first orientation and the second orientation.

8. The image reading apparatus according to claim 7, wherein the second aperture is located in one position on one end in a longitudinal direction of the mounting portion.

9. An image forming apparatus comprising:
the image reading apparatus according to claim 1; and
an image forming unit that forms an image read by the image reading apparatus on a sheet.

* * * * *